US012687964B2

(12) United States Patent
Shveidel et al.

(10) Patent No.: US 12,687,964 B2
(45) Date of Patent: Jul. 21, 2026

(54) SYSTEM AND METHOD FOR EFFECTUATING A TRANSACTIONAL JOURNAL WITH A DEDICATED DATA CONTAINER IN A DELTA LOG-BASED STORAGE SYSTEM

(71) Applicant: Dell Products L.P., Round Rock, TX (US)

(72) Inventors: Vladimir Shveidel, Pardes-Hana (IL); Jenny Derzhavetz, Raanana (IL); Dror Zalstein, Givatayim (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/922,660

(22) Filed: Oct. 22, 2024

(65) Prior Publication Data

US 2026/0111113 A1 Apr. 23, 2026

(51) Int. Cl.
*G06F 3/06* (2006.01)
(52) U.S. Cl.
CPC .............. *G06F 3/061* (2013.01); *G06F 3/065* (2013.01); *G06F 3/0679* (2013.01)

12

(58) Field of Classification Search
CPC .... G06F 3/065; G06F 11/1471; G06F 3/0679; G06F 3/061
See application file for complete search history.

(56) References Cited

U.S. PATENT DOCUMENTS

| | | | | |
|---|---|---|---|---|
| 2016/0170833 A1* | 6/2016 | Segura | ............... | G06F 11/1088 |
| | | | | 714/6.23 |
| 2017/0068685 A1* | 3/2017 | Kim | ........................ | G06F 16/27 |
| 2018/0067673 A1* | 3/2018 | Agombar | .............. | G06F 3/0631 |
| 2019/0294506 A1* | 9/2019 | Brown | ............... | G06F 11/1448 |
| 2024/0289272 A1* | 8/2024 | Tiwari | ............... | G06F 12/0246 |
| 2024/0295968 A1* | 9/2024 | Sugimoto | ............. | G06F 3/0673 |

* cited by examiner

*Primary Examiner* — Jane W Benner
(74) *Attorney, Agent, or Firm* — Brian J. Colandreo; Heath M. Sargeant; Holland & Knight LLP

(57) ABSTRACT

A method, computer program product, and computing system for processing an input/output (IO) request on a storage processor within a storage system. An entry is generated in a transactional journal for the IO request. A copy of the entry is stored in the transactional journal in a dedicated data container in volatile memory of the storage processor. In response to processing a subsequent IO request associated with the entry, the entry is at least partially overwritten in the dedicated data container.

17 Claims, 8 Drawing Sheets

12

10

SYSTEM AND METHOD FOR EFFECTUATING A TRANSACTIONAL JOURNAL WITH A DEDICATED DATA CONTAINER IN A DELTA LOG-BASED STORAGE SYSTEM

BACKGROUND

Storing and safeguarding electronic content may be beneficial in modern business and elsewhere. Accordingly, various methodologies may be employed to protect and distribute such electronic content.

For example, many storage systems perform a type of "optimistic" optimization that assumes that candidate entries with a certain level of similarity are duplicates of a given entry and performs deduplication by increasing a reference count for the given entry indicating duplicate entries while freeing up the storage capacity used by the candidate entry. However, this approach requires the ability to rollback rare false-positive updates (i.e., a candidate entry that was not a duplicate of the given entry). These optimistic deduplications may introduce temporal inconsistencies by applying deduplication on a virtual entry optimistically separately from binding it to a metadata block. As such, journals that record transaction process and invalidating of journal entries upon completion are used. However, this approach with these journals introduces the following challenges: 1) a full set of records should be continuously effectively accessible from volatile memory and recoverable from persistent memory; 2) such records cannot be maintained in dedicated separate persistent area; and 3) journal records are updated at a high rate, hence even light inefficiency may have significant performance impacts.

SUMMARY OF DISCLOSURE

In one example implementation, a computer-implemented method executed on a computing device may include, but is not limited to, processing a an input/output (IO) request on a storage processor within a storage system. An entry is generated in a transactional journal for the IO request. A copy of the entry is stored in the transactional journal in a dedicated data container in volatile memory of the storage processor. In response to processing a subsequent IO request associated with the entry, the entry is at least partially overwritten in the dedicated data container.

One or more of the following example features may be included. The dedicated data container includes a dedicated array of entries for each flushing client that flushes the data to persistent storage within the storage system. It may be determined that the predefined storage capacity of the dedicated data container is met. A storage location marker may be generated in the transactional journal. Each entry may be copied from the dedicated data container to a second dedicated data container. A persisted copy of the dedicated data container may be generated by copying each entry from the dedicated data container to the transactional journal after the storage location marker. New entries are copied from the transactional journal to the second dedicated data container. A failure event associated with the storage system may be detected. Each entry of dedicated data container may be recovered by generating a new dedicated data container; and loading each entry of from the persisted copy of the dedicated data container to the new dedicated data container. An optimistic data deduplication operation may be performed based on the io request. An incorrect data deduplication resulting from the optimistic data deduplication operation may be identified and the incorrect data deduplication may be resolved by restoring a previous state of the entry associated with the incorrect data deduplication.

In another example implementation, a computer program product resides on a computer readable medium that has a plurality of instructions stored on it. When executed by a processor, the instructions cause the processor to perform operations that may include, but are not limited to, processing a an input/output (IO) request on a storage processor within a storage system. An entry is generated in a transactional journal for the IO request. A copy of the entry is stored in the transactional journal in a dedicated data container in volatile memory of the storage processor. In response to processing a subsequent IO request associated with the entry, the entry is at least partially overwritten in the dedicated data container.

One or more of the following example features may be included. The dedicated data container includes a dedicated array of entries for each flushing client that flushes the data to persistent storage within the storage system. It may be determined that the predefined storage capacity of the dedicated data container is met. A storage location marker may be generated in the transactional journal. Each entry may be copied from the dedicated data container to a second dedicated data container. A persisted copy of the dedicated data container may be generated by copying each entry from the dedicated data container to the transactional journal after the storage location marker. New entries are copied from the transactional journal to the second dedicated data container. A failure event associated with the storage system may be detected. Each entry of dedicated data container may be recovered by generating a new dedicated data container; and loading each entry of from the persisted copy of the dedicated data container to the new dedicated data container. An optimistic data deduplication operation may be performed based on the io request. An incorrect data deduplication resulting from the optimistic data deduplication operation may be identified and the incorrect data deduplication may be resolved by restoring a previous state of the entry associated with the incorrect data deduplication.

In another example implementation, a computing system includes at least one processor and at least one memory architecture coupled with the at least one processor, wherein the at least one processor is configured to process a an input/output (IO) request on a storage processor within a storage system. An entry is generated in a transactional journal for the IO request. A copy of the entry is stored in the transactional journal in a dedicated data container in volatile memory of the storage processor. In response to processing a subsequent IO request associated with the entry, the entry is at least partially overwritten in the dedicated data container.

One or more of the following example features may be included. The dedicated data container includes a dedicated array of entries for each flushing client that flushes the data to persistent storage within the storage system. It may be determined that the predefined storage capacity of the dedicated data container is met. A storage location marker may be generated in the transactional journal. Each entry may be copied from the dedicated data container to a second dedicated data container. A persisted copy of the dedicated data container may be generated by copying each entry from the dedicated data container to the transactional journal after the storage location marker. New entries are copied from the transactional journal to the second dedicated data container. A failure event associated with the storage system may be detected. Each entry of dedicated data container may be recovered by generating a new dedicated data container; and loading each entry of from the persisted copy of the dedicated data container to the new dedicated data container. An optimistic data deduplication operation may be performed based on the io request. An incorrect data deduplication resulting from the optimistic data deduplication operation may be identified and the incorrect data deduplication may be resolved by restoring a previous state of the entry associated with the incorrect data deduplication.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
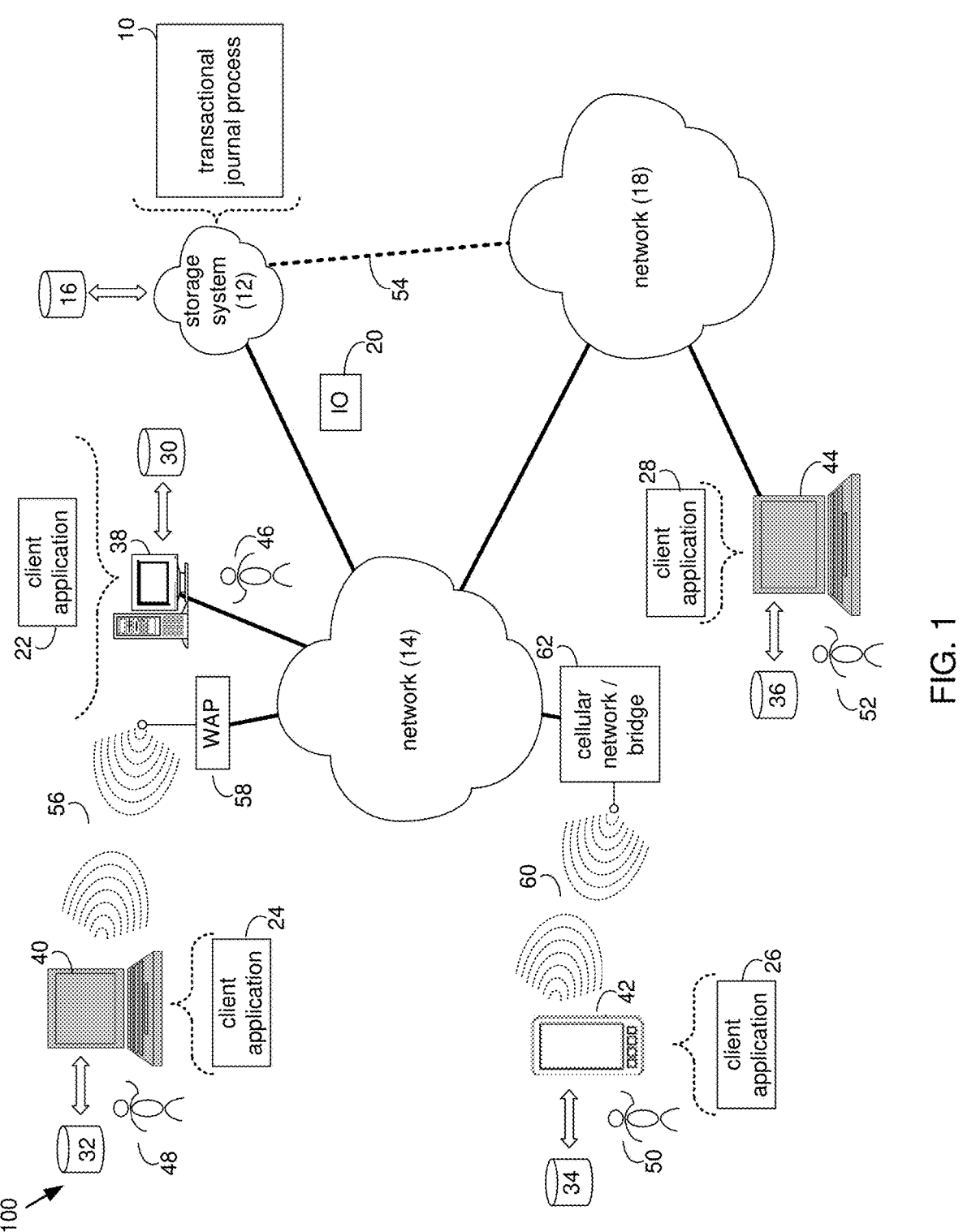
FIG. 1 is an example diagrammatic view of a storage system and a transactional journal process coupled to a distributed computing network according to one or more example implementations of the disclosure.

Referring to FIG. 1, there is shown transactional journal process 10 that may reside on and may be executed by storage system 12, which may be connected to network 14 (e.g., the Internet or a local area network). Examples of storage system 12 may include but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of transactional journal process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally, alternatively, some portions of the instruction sets and subroutines of transactional journal process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a transactional journal process, such as transactional journal process 10 of FIG. 1, may include but is not limited to, processing a an input/output (IO) request on a storage processor within a storage system. An entry is generated in a transactional journal for the IO request. A copy of the entry is stored in the transactional journal in a dedicated data container in volatile memory of the storage processor. In response to processing a subsequent IO request associated with the entry, the entry is at least partially overwritten in the dedicated data container.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
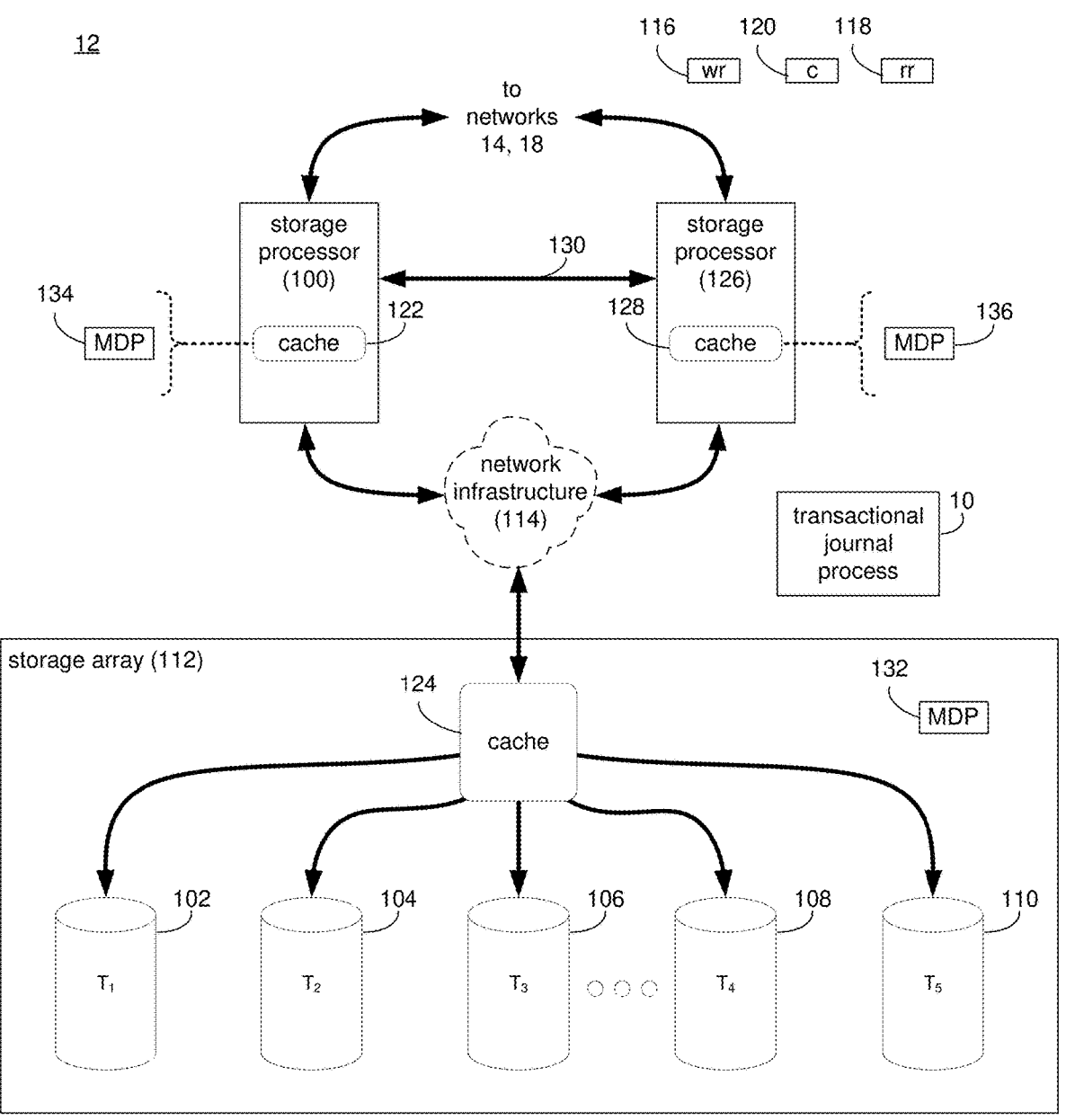
FIGS. 2-3 are example diagrammatic views of the storage system of FIG. 1 according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of transactional journal process 10. The instruction sets and subroutines of transactional journal process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of transactional journal process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of transactional journal process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of transactional journal process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. Modern storage arrays abstract the physical media and present logical (virtualized) addresses to clients in the form of LUNs. The mapping between the logical address and physical address is a form of metadata that the array needs to manage. That is typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
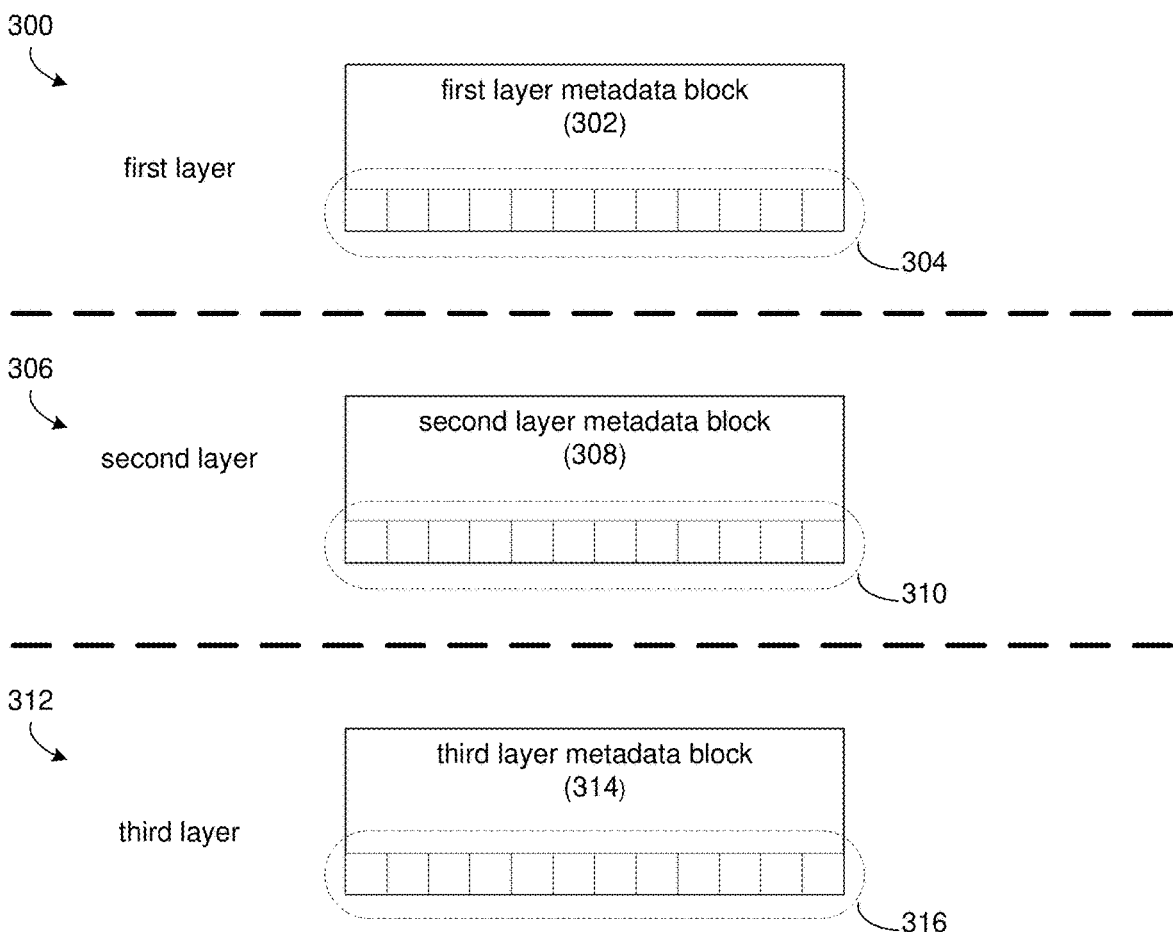

Referring also to FIG. 3, a storage system may generally include three layers of metadata blocks. While the following example includes metadata "blocks", it will be appreciated that other units of data storage may be used within the scope of the present disclosure. For example, a metadata block may be referred to as a metadata page. In another example, a combination of a number of metadata blocks may define a metadata page. In this manner, it will be appreciated that the term "metadata page" may represent an individual metadata block or a grouping of metadata blocks. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one. As will be discussed in greater detail below, second layer metadata blocks (e.g., second layer metadata block 308) may be stored in a storage array (e.g., on one of storage targets 102, 104, 106, 108 of storage array 112).

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may have a predefined amount of storage capacity for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

Metadata Log Architecture:

In some implementations, various operations may be performed on metadata pages (e.g., second layer metadata block 308) in a storage system. For example, operations that may be performed on the metadata pages (e.g., metadata page (MDP)) may generally include writing new pages or blocks of user data to a storage array, performing deduplication on existing data, removing data, garbage collection operations, etc. In some implementations, each node (e.g., storage processor 100, 126) may include a cache memory system configured to manage or handle these operations (e.g., TxCache component 122, 128). In some implementations, each TxCache component (e.g., TxCache component 122, 128) may be configured (e.g., by transactional journal process 10) to manage locks on metadata pages, provide transactional protection for composite updates requiring multiple page writes atomically, provide a least recently used (LRU) cache for metadata pages in order to avoid excessive reading of the metadata blocks from the storage array, and LRU cache invalidation (e.g., invalidation of an existing metadata page on one node in response to updating the metadata page on another node).

In some implementations and as will be discussed in greater detail below, transactional journal process 10 may store updates or "deltas" for a metadata page rather than doing a full read modify process. Deltas may be aggregated in data containers called "tablets"; first in a cache memory system in an "active tablet." When active tablet is full, transactional journal process 10 may destage the active tablet to the storage array. In some implementations, transactional journal process 10 may aggregate several tablets on the storage array. Tablets within the storage array may be divided into two batches. Once a batch is full, transactional journal process 10 may destage the batch (i.e., the aggregated tablets) to a metadata page store. Transactional journal process 10 may read the previous metadata page from the storage array and may apply the deltas of the destaged batch. However, transactional journal process 10 may apply deltas from tablets in destage only, meaning that the updated metadata page (i.e., current metadata page with applied deltas from destaged batch) is not up to date with all deltas as only one batch may be in destage at a time.

Accordingly, the destaging or flushing of deltas may be detached from the cache memory system, meaning that this process does not destage up-to-date pages to the metadata store and does not update to the cache memory system. This allows destaging to not block user writes, since a write operation is adding new deltas to the active tablet. In addition, this approach may also prevent any reclaiming of an active tablet, since transactional journal process 10 may destage only half of the tablets while the active tablet is destaged to another batch.

In some implementations, transactional journal process 10 may receive, at a node of a multi-node storage system, one or more updates or deltas to a metadata page. As discussed above and in some implementations, a metadata page may generally include a reference to a physical location of user data within a storage array. Referring again to the example of FIG. 3 and in some implementations, a metadata page (e.g., second layer metadata block 308) may encapsulate the physical location of user data and allow relocation without updating first layer metadata blocks (e.g., first layer metadata block 302). Accordingly, the terms "metadata block", "metadata page", and "second layer metadata block" may be used interchangeably throughout the present disclosure.

Referring again to the example of FIG. 2, suppose a node (e.g., storage processor 100) receives one or more updates to a metadata page (e.g., metadata page 132). As discussed above, metadata pages may be stored in a storage array (e.g., storage array 112) and cached copies of the metadata pages may be temporarily stored in cache memory systems of nodes coupled to the storage array (e.g., metadata page 134 in cache memory system 122 of storage processor 100 and metadata page 136 in cache memory system 128 of storage processor 126, where each of metadata pages 134, 136 are cached copies of metadata page 132). While the example of FIG. 2 shows a cached copy of metadata page 132 in both cache memory systems 122, 128 of storage processors 100, 126, it will be appreciated that each storage processor may or may not have a cached copy of a metadata page within its cache memory system at a given time. For example, suppose metadata page 134 is invalidated. In this example, storage processor 100 would need to re-cache a copy of metadata page 132 from storage array 112 into cache memory system 122.

In some implementations, transactional journal process 10 may store one or more metadata page deltas associated with the metadata page in a cache memory system of the node. For example, transactional journal process 10 may store the one or more metadata page deltas in a data container associated with a specific metadata page. In some implementations, a data container may generally include a data structure for storing one or more metadata changes or metadata page deltas. Each data container or bucket of the one or more data containers or buckets may be associated with a particular metadata page. For example and as will be discussed in greater detail below, each data container may store one or more reference count changes or deltas associated with a particular metadata page or block. The one or more data containers may be stored in volatile memory. Volatile memory may generally include any temporary memory of a storage system. In one example, the memory may include Random Access Memory (RAM) based storage within a storage processor/node (e.g., cache memory system 122). RAM-based memory system may include non-persistent RAM-based storage. As is known in the art, non-persistent RAM-based storage is RAM-based storage that will lose its data in the event of e.g., a power failure. However, it will be appreciated that other forms or types of volatile memory may be used within the scope of the present disclosure.

In some implementations, transactional journal process 10 may receive one or more metadata page deltas associated with a metadata page. As discussed above, a storage processor (e.g., storage processor 100) may receive an operation that may specify a change to a metadata page within the storage array (e.g., data array 112). Accordingly, the one or more deltas may specify changes to a metadata page in the storage array.

Figure 4:
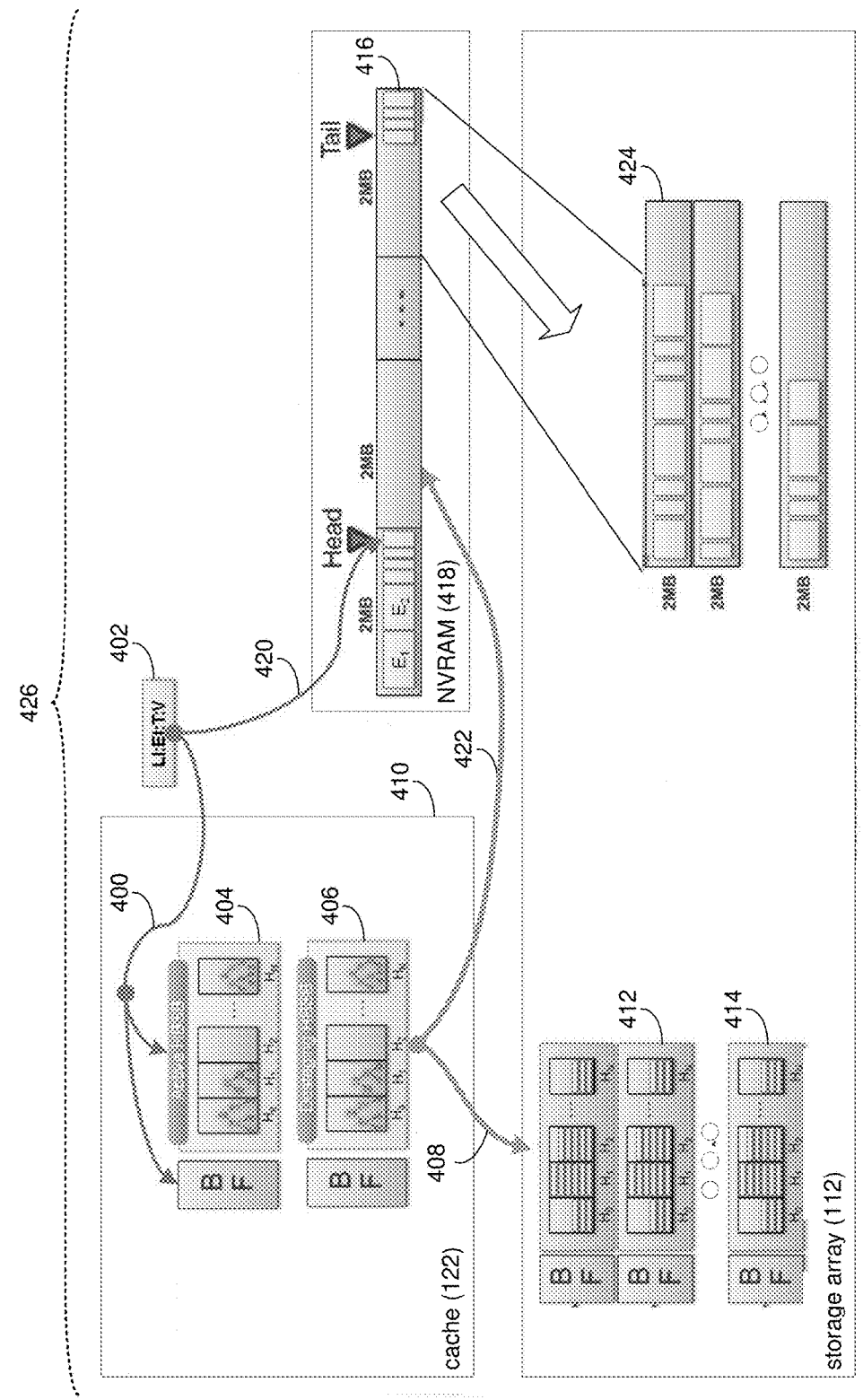
FIGS. 4-6 are example diagrammatic views of the transactional journal process of FIG. 1 according to one or more example implementations of the disclosure.

Referring also to FIG. 4 and in some implementations, transactional journal process 10 may route (represented by arrow 400) each metadata page delta (e.g., metadata page delta 402) to a specific data container or bucket of the one or more data containers. In some implementations, each data container of the one or more data containers (e.g., one or more data containers 404, 406) may be organized as a binary tree of metadata page deltas. For example, upon writing the metadata page delta to a specific data container, transactional journal process 10 may sort the metadata page deltas based upon, at least in part, an insertion order. In other words, each metadata page delta may be sorted in the binary tree structure within the data container based on when the metadata page delta was received. While a binary tree structure has been described, it will be appreciated that various sorting algorithms or data structures may be used within the scope of the present disclosure.

In some implementations, transactional journal process 10 may write one or more metadata page deltas associated with a metadata page stored in a storage array, to the plurality of tablets in the cache memory system. Referring again to FIGS. 2 and 4 and returning to the above example where storage processor 100 receives one or more metadata page deltas associated with metadata page 132, transactional journal process 10 may write one or more metadata page deltas (e.g., metadata page delta 402) in cache memory system 122. Specifically, transactional journal process 10 may write the one or more metadata page deltas (e.g., metadata page delta 402) in one or more data containers within a plurality of tablets (e.g., tablets 404, 406). In one example, transactional journal process 10 may write the one or more metadata page deltas (e.g., metadata page delta 402) in a data container associated with metadata page 132.

In some implementations, transactional journal process 10 may write the one or more metadata page deltas to an active tablet. An active tablet may generally include a tablet with one or more data containers (e.g., a data container for each metadata page). In some implementations, each tablet may have a predefined storage capacity (e.g., as a portion of the total cache memory system size). Accordingly, when the active tablet is full, transactional journal process 10 may switch the active tablet with an empty tablet. The active tablet may then be destaged to the storage array (i.e., a destaging tablet). As will be discussed in greater detail below, destaging may generally include writing the one or more metadata changes from a set of data containers to the storage array.

For example and as shown in FIG. 4, transactional journal process 10 may write the one or more metadata page deltas (e.g., metadata page delta 402) in one or more data containers within an active tablet. In one example, suppose tablet 406 is the "active" tablet. In this example, transactional journal process 10 may write the one or more metadata page deltas (e.g., metadata page delta 402) in one or more data containers within tablet 406. When tablet 406 is full (e.g., based on one or more predefined thresholds for tablet 406), transactional journal process 10 may switch active tablet 406 with an empty tablet (e.g., tablet 404). In this example, tablet 404 may be the active table for writing the one or more metadata page deltas associated with a metadata page and tablet 406 may be the destaging tablet. In some implementations, metadata change aggregation process 10 may write one or more subsequent metadata changes to active tablet 404.

In some implementations, transactional journal process 10 may write each metadata page delta stored in at least one tablet of the plurality of tablets, to the metadata page stored in the storage array, thus defining one or more destage tablets. For example, writing the one or more metadata page deltas stored in at least one tablet of the plurality of tablets to the storage array may include writing or flushing the at least one tablet to the storage array. For example and referring again to the example of FIG. 4, transactional journal process 10 may write (represented with arrow 408) the destaging tablet (e.g., tablet 406) to the storage array (e.g., data array 112). In this manner, transactional journal process 10 may aggregate multiple destage tablets (e.g., destage tablets 410, 412, 414) within data array 112 before writing the one or more metadata updates to the metadata page.

As discussed above and in some implementations, the destage tablets may include a plurality of data container pages that have a pre-defined size of a metadata page (e.g., 4 KB). Similar to the set of data containers stored in the cache memory system, each tablet of delta container pages may have a delta container page associated with a respective metadata page. In some implementations, a delta container page may sort the one or more metadata changes for a particular metadata page by insertion time. In some implementations, a set of tablets (e.g., tablets 410, 412, 414) may be organized in a storage array (e.g., storage array 112) as a ring buffer. For example, a tablet may be added to a "head" of the ring buffer and released or deleted from a "tail" of the ring buffer. The process of releasing or deleting tablet will be described in greater detail below.

In some implementations, transactional journal process 10 may write the one or more metadata page deltas to a metadata journal in non-volatile memory. Referring again to the example of FIG. 4 and in some implementations, transactional journal process 10 may generate a metadata journal (e.g., metadata journal 416) in non-volatile memory (e.g., non-volatile Random Access Memory (NVRAM) 418). In some implementations, the metadata journal may store (indicated by arrow 420) metadata page deltas in time order (e.g., sorted oldest to newest). In some implementations, the contents (e.g., metadata page delta 402) of the may preserved in the event of a power failure or other failure of the cache memory system. In some implementations and in response to the failure of the cache memory system, transactional journal process 10 may recover the one or more metadata page deltas from the metadata journal (e.g., metadata journal 416).

In some implementations and in response to destaging or writing the one or more metadata page deltas to the storage array (e.g., writing the tablets from the cache memory system to the storage array), transactional journal process 10 may release or free (indicated by arrow 422) the corresponding part of the metadata journal (e.g., metadata journal 416). In some implementations, transactional journal process 10 may determine that the metadata journal (e.g., metadata journal 416) is full and may write at least a portion of the one or more metadata page deltas stored in the metadata journal to the storage array (e.g., data array 112). In some implementations, the at least a portion of the one or more metadata page deltas written to the storage array may be stored as e.g., 2 MB chunks (e.g., data chunk 424) in the storage array (e.g., storage array 112). While a 2 MB chunk has been discussed, it will be appreciated that the at least a portion of the one or more metadata page deltas may be stored in various chunks or blocks of varying sizes.

As will be discussed in greater detail below, the combination of data containers 404, 406 and metadata journal 416 may define a metadata log architecture (e.g., metadata log 426). For example, with data containers 504, 506 and metadata journal 416, transactional journal process 10 may asynchronously flush or destage data from metadata log 426 to persistent storage (e.g., storage array 112).

In some implementations, transactional journal process 10 may aggregate the one or more metadata page deltas and write the one or more metadata page deltas to the metadata page. For example, transactional journal process 10 may combine a plurality of metadata page deltas associated with a metadata page from the destage tablets in the storage array. Referring also to the example of FIG. 5, transactional journal process 10 may combine a delta container page associated with a particular metadata page from at least one tablet (e.g., destage tablets 500, 502, 504, 506), thus defining a batch (e.g., batches 508, 510, 512, 514).

Figure 5:
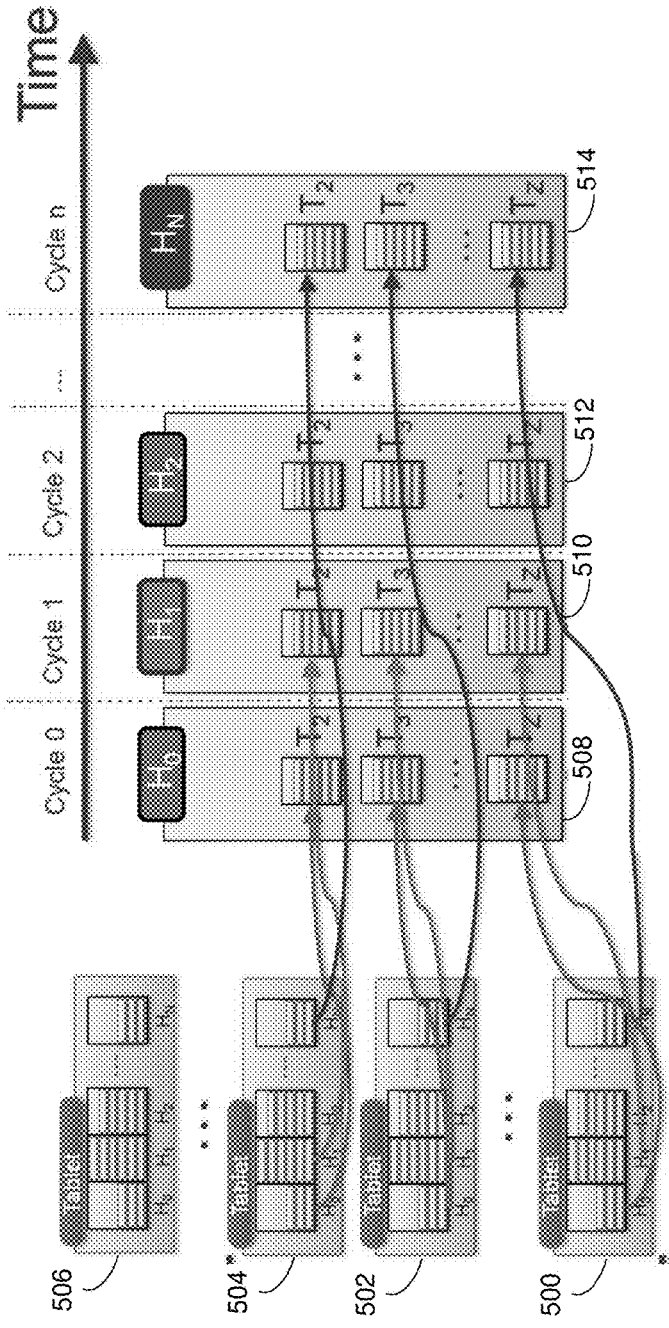

As shown in the example of FIG. 5, destage tablets 500, 502, 504, 506 may include metadata page deltas associated with (in this example) four metadata pages. Accordingly, transactional journal process 10 may combine the metadata page deltas from each of the destage tablets (e.g., destage tablets 500, 502, 504, 506) for each metadata page to define a batch for each metadata page (e.g., batches 508, 510, 512, 514). In some implementations, transactional journal process 10 may generate one batch per cycle. While a single batch per cycle has been described, it will be appreciated that any number of batches may be generated per any number of cycles.

Figure 6:
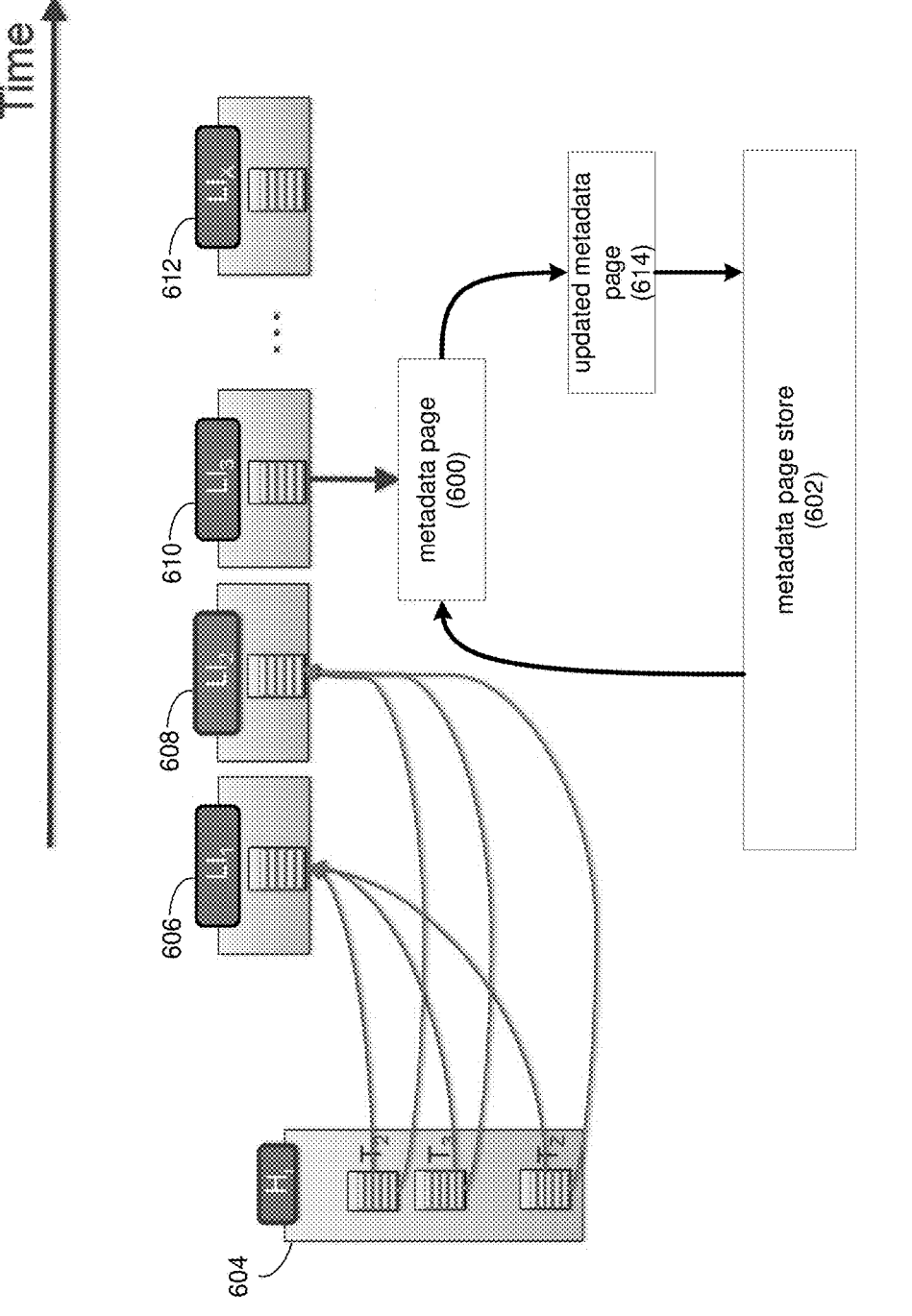

Referring also to the example of FIG. 6 and in some implementations, transactional journal process 10 may read the metadata page from the storage array. In some implementations, the metadata page (e.g., metadata page 600 as shown in FIG. 6) may be read from a metadata page store (e.g., metadata page store 602) on the storage array (data array 112). In some implementations, transactional journal process 10 may merge the one or more metadata page deltas from the batches of FIG. 5 and the metadata page read from the storage array, thus defining an updated metadata page. As shown in FIG. 6 and in some implementations, transactional journal process 10 may sort the first portion of the one or more metadata page deltas from a plurality of batches (e.g., batch 604) by time, thus defining an aggregated list of metadata page deltas (e.g., aggregated lists 606, 608, 610, 612) for each metadata page. In response to sorting the one or more metadata page deltas from the batches to define the aggregated list, transactional journal process 10 may merge the aggregated list (e.g., aggregated list 610) and the metadata page read from the storage array (e.g., metadata page 600) to generate an updated metadata page (e.g., updated metadata page 614). In some implementations, transactional journal process 10 may write the updated metadata page to the storage array (including the first portion of the one or more metadata page deltas).

Figure 7:
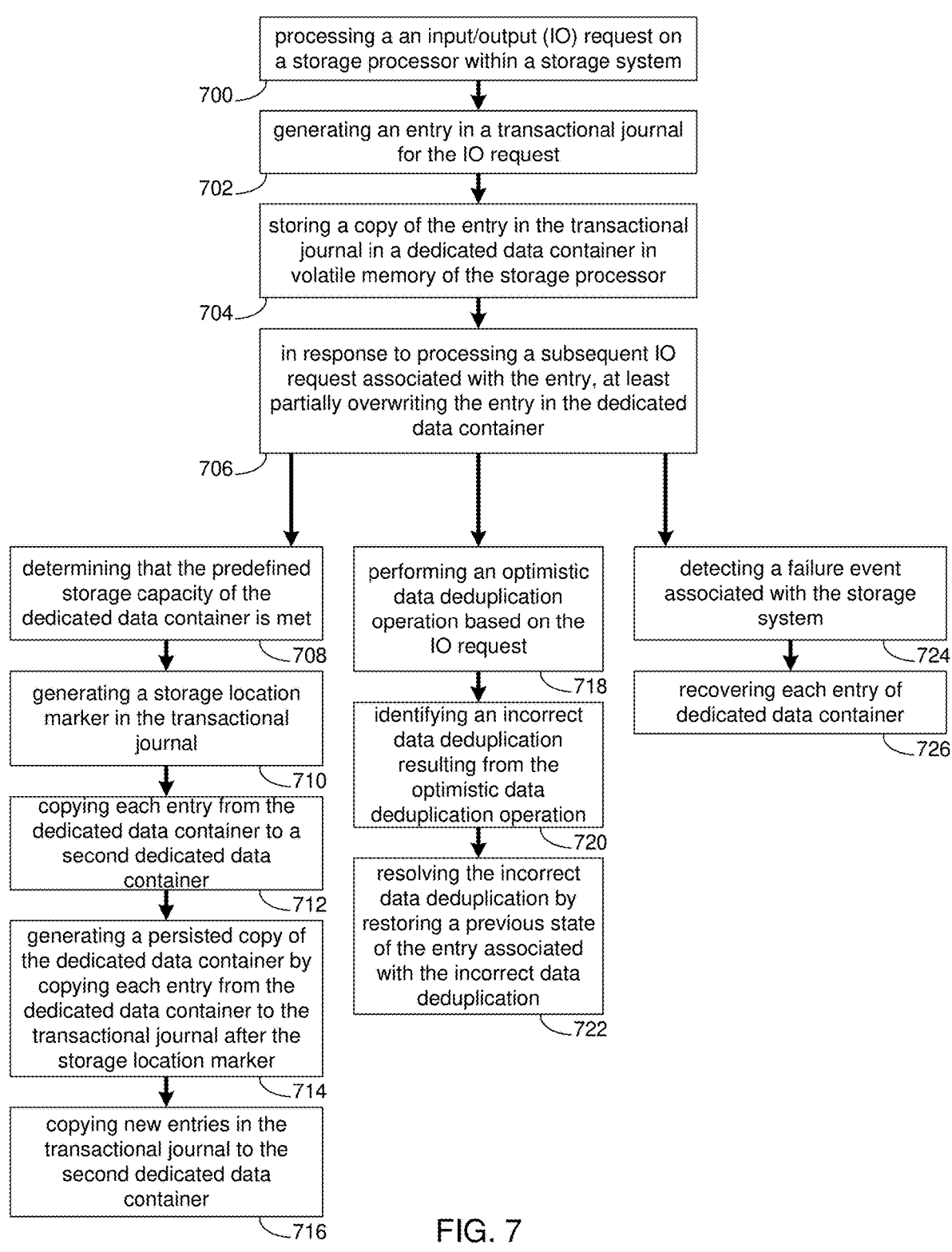
FIG. 7 is an example flowchart of the transactional journal process of FIG. 1 according to one or more example implementations of the disclosure.
Figure 8:
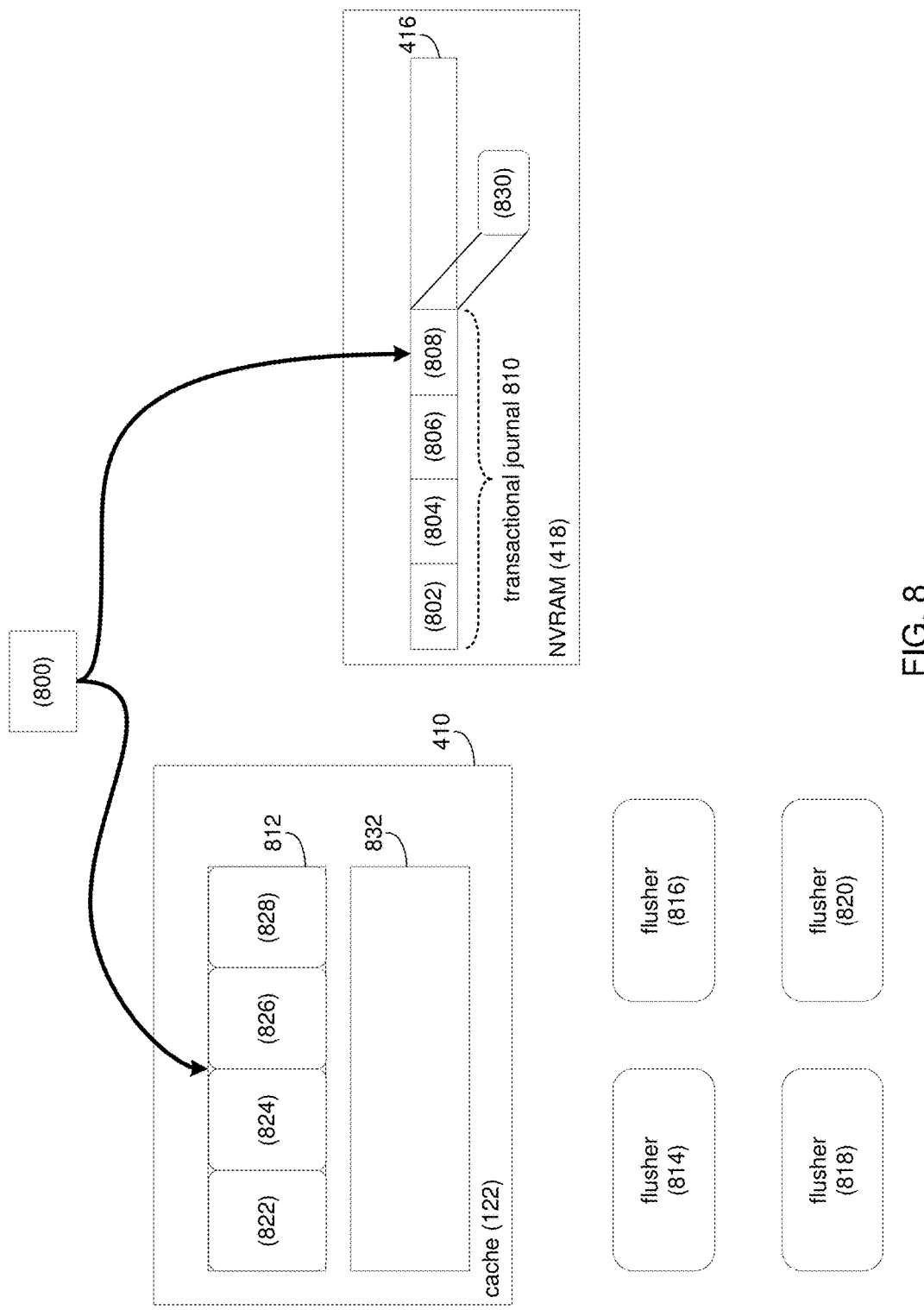
FIG. 8 is an example diagrammatic view of the transactional journal process of FIG. 1 according to one or more example implementations of the disclosure.

The Transactional Journal Process:

Referring also to FIGS. 7-8 and in some implementations, transactional journal process 10 may process 700 a an input/output (IO) request on a storage processor within a storage system. An entry is generated 702 in a transactional journal for the IO request. A copy of the entry is stored 704 in the transactional journal in a dedicated data container in volatile memory of the storage processor. In response to processing a subsequent IO request associated with the entry, the entry is at least partially overwritten 706 in the dedicated data container.

As will be discussed in greater detail below, implementations of the present disclosure allow for efficient handling of a bounded transactional journal in a delta log-based storage system that provides high performance and memory/capacity efficiency. For example and as discussed above, previous approaches involving transactional journals introduce the following challenges: 1) a full set of records should be continuously effectively accessible from volatile memory and recoverable from persistent memory; 2) such records cannot be maintained in dedicated separate persistent area; and 3) journal records are updated at a high rate, hence even light inefficiency may have significant performance impacts. For example, as the transactional journal (i.e., storage mechanism to keep a recording available for inflight process and invalidate such recordings after processing is finished, without aggregation) is used by many transactions in parallel, the transactional journal should be extremely efficient from both performance perspective (CPU, BE writes etc.) and a resource-consuming perspective (memory and logspace) to avoid an impact on a metadata aggregation level.

In some implementations, transactional journal process 10 processes 700 an input/output (IO) request on a storage processor within a storage system. As described above, transactional journal process 10 receives, at a node of a multi-node storage system, one or more updates or deltas to a metadata page in the form of an IO request. As discussed above and in some implementations, a metadata page may generally include a reference to a physical location of user data within a storage array of the storage system. In this example and as shown in FIG. 8, delta 800 is generated from an IO request with one or more updates to an entry in a transactional journal. In one example, delta 800 includes a type, an entry index, an offset within a data container, and a value (i.e., a size plus the payload of the record being updated or overwritten). As will be discussed in greater detail below, delta 800 is processed in a similar manner to delta 402 as shown in FIG. 4 but is stored by overwriting or updating an entry in a dedicated data container as opposed to being aggregated before being flushed or written to a metadata page store (as shown in FIG. 6).

In some implementations, transactional journal process 10 generates 702 an entry in a transactional journal for the IO request. For example and as described above, transactional journal process 10 writes the one or more metadata page deltas generated from the IO request to a transactional journal in non-volatile memory. Referring again to the example of FIG. 4 and in some implementations, transactional journal process 10 may generate a metadata journal (e.g., metadata journal 416) in non-volatile memory (e.g., non-volatile Random Access Memory (NVRAM) 418). In some implementations, the metadata journal may store (indicated by arrow 420) metadata page deltas in time order (e.g., sorted oldest to newest). In addition, transactional journal process 10 may generate 702 an entry (e.g., entries 802, 804, 806, 808) in transactional journal 810 defined from metadata journal 416. In some implementations, the contents (e.g., metadata page delta 402 and entry 802) of the may preserved in the event of a power failure or other failure of the cache memory system. In some implementations and in response to the failure of the cache memory system, transactional journal process 10 may recover the one or more metadata page deltas from the metadata journal (e.g., metadata journal 416) and, as will be described in greater detail below, the entries (e.g., entries 802, 804, 806, 808) from the transactional journal (e.g., transactional journal 810).

In some implementations, transactional journal process 10 stores 704 a copy of the entry in the transactional journal in a dedicated data container in volatile memory of the storage processor. For example, a dedicated data container (e.g., dedicated data container 812) is a data structure for storing each entry (e.g., delta 402). The dedicated data container, or bucket, is dedicated to storing copies of entries from transactional journal 810. In some implementations, transactional journal process 10 initializes dedicated data container 812 by pre-allocating a single contiguous chunk of memory in cache memory 122. In some implementations, the dedicated data container includes a dedicated array of entries for each flushing client that flushes the data to persistent storage within the storage system. For example, dedicated data container 812 may be an array of a predefined number of entries, with a dedicated array of entries each flushing client (e.g., flushers 814, 816, 818, 820) that process entries from the dedicated data container 812. As shown in FIG. 8, transactional journal process 10 stores 702 a copy of entries in dedicated data container 812 with dedicated subarrays 822, 824, 826, 828 for flushers 814, 816, 818, 820, with dedicated subarray 822 for flusher 814; dedicated subarray 824 for flusher 816; dedicated subarray 826 for flusher 818; and dedicated subarray 828 for flusher 820.

In some implementations and in response to processing a subsequent IO request associated with the entry, transactional journal process 10 at least partially overwrites 706 the entry in the dedicated data container. For example, each flusher (e.g., flushers 814, 816, 818, 820) may either read an entry, or overwrite it fully or partially. In this manner and unlike the processing of metadata page deltas described above, transactional journal process 10 does not aggregate entries of dedicated data container 812. Accordingly, the content of each entry is opaque to the metadata log as its interpretation is fully the flusher's responsibility. In some implementations, this approach provides effective non-blocking access to entries of dedicated data container 812 for both "read" and "update" operations. Further, no data container spinlock is required for flushers accessing entries of dedicated data container 812.

In some implementations, transactional journal process 10 determines 708 that the predefined storage capacity of the dedicated data container is met. For example, the capacity of dedicated data container may be a predefined storage capacity. Transactional journal process 10 may monitor the current storage capacity of dedicated data container 812 and determine that a threshold (i.e., 95%) of the predefined storage capacity is achieved or met. In responses to determining that the predefined storage capacity of the dedicated data container is met, transactional journal process 10 freezes dedicated data container 812 from processing new entries.

In some implementations and in response to freezing dedicated data container 812, transactional journal process 10 generates 710 a storage location marker in the transactional journal. A storage location marker (e.g., storage location marker 830) is a representation of position in metadata journal 416 where a persisted copy of the current contents of dedicated data container 812 are to be stored. In this manner, storage location marker 830 acts a bookmark within metadata journal 416.

In some implementations, transactional journal process 10 copies 712 each entry from the dedicated data container to a second dedicated data container. For example, transactional journal process 10 copies the entire contents of dedicated data container 812 as a Binary Large Object (BLOB) to a new dedicated data container (e.g., second dedicated data container 832). In some implementations, each entry in dedicated data container 812 is persisted to metadata journal 416 as a special single BLOB record, where this "single write operation" is extremely cheap performance wise and not intrusive to metadata journal 416 capacity-wise as the entire contents are typically between 10-200 kilobytes.

In some implementations, transactional journal process 10 generates 714 a persisted copy of the dedicated data container by copying each entry from the dedicated data container to the transactional journal after the storage location marker. For example, to preserve the contents of dedicated data container 812 in the event of a failure event, transactional journal process 10 generates a persisted copy of the entries of dedicated data container 812 by copying the entries to transactional journal 810 after storage location marker 830. In some implementations, transactional journal process 10 copies 716 new entries in the transactional journal to the second dedicated data container. With second dedicated data container 832, transactional journal process 10 applies subsequent deltas for existing entries and new entries to second dedicated data container 832. Accordingly, entries in both dedicated data container 812 and second dedicated data container 832 are not destaged to metadata page store and have no metadata page representation. In this manner, the last state of any entry is always up-to date and accessible in cache memory.

In some implementations, transactional journal process 10 performs 718 an optimistic data deduplication operation based on the IO request. Foe example, a conventional deduplication operation performed by a flusher includes: 1) processing, for all virtual layer blocks in a transaction, all relevant virtual entries for "deduplication candidates"; 2) validating "deduplication candidates"; 3) binding all unique data (i.e., data this is not a deduplication) in a leaf lock; 4) binding all duplicated data and incrementing an reference count involving a virtual layer read lock and a leaf lock. In this example, steps 1 and 2 do not change virtual entries. Rather, they are just sorted for unique data or deduplication candidacy. Once locks are released, the virtual entry and leaf are consistent again (with new updates). The above approach works but is inefficient because a virtual layer block is locked twice if it has a deduplication virtual entry candidate.

By contrast, an optimistic deduplication relies on the principle that nearly all deduplication candidates are actual deduplications as opposed to an incorrect deduplication. As such, an optimistic deduplication performs the following operations: 1) hold a read lock on all virtual layer blocks in a transaction; 2) for every virtual, determine whether any deduplication candidates are found; 3) For each deduplication candidate, increment the reference count for the virtual entry; 4) validate all deduplication candidates and determine when an incorrect data deduplication has been applied.

Accordingly and in some implementations, transactional journal process 10 identifies 720 an incorrect data deduplication resulting from the optimistic data deduplication operation. In some implementations, transactional journal process 10 resolves 722 the incorrect data deduplication by restoring a previous state of the entry associated with the incorrect data deduplication. For example, in response to identifying 720 an incorrect data deduplication: 1) for all virtual layer blocks in the transaction with a virtual entry having an incorrect data deduplication operation; 2) revert decision to deduplicate (so it will be processed as unique data); 3) bind to leaf by holding a leaf lock; 4) for correctly applied deduplication, the virtual entry is removed from a list of incremented virtual entries; 5) a read lock is held on all virtual layer blocks having incorrectly deduplicated virtual entries; and 6) the incrementing of the reference count is reverted on each of these virtual entries. In some implementations, these steps are transactional or "atomic", meaning that all metadata updates collected during those steps must be either persisted all together or none of them. This means that in case of failure event, transactional journal process 10 recovers exactly all inconsistent virtual entries. This need is resolved by transactional journal 810. With implementations of the present disclosure, transactional journal 810 is persisted in metadata journal 416 but is processed from dedicated data container 812. In this manner, the entries from transactional journal 810 are persisted during a failure event but are accessible from cache memory using the dedicated data container.

In some implementations, transactional journal process 10 detects 724 a failure event associated with the storage system and recovers 726 each entry of dedicated data container by generating a new dedicated data container and loading each entry of from the persisted copy of the dedicated data container to the new dedicated data container. For example, transactional journal process 10 detects 724 a failure event (i.e., an event that causes volatile memory in cache memory 122 to be lost) and in response to detecting 724 the failure event, transactional journal process 10 recovers 726 the processing of the IO request by identifying storage location marker 430 which will act as a recovery bookmark. For instance, transactional journal process 10 initializes a new dedicated data container; pre-allocates each entry at predefined offsets in the new dedicated data container; loads each entry from transactional journal 810 to new dedicated data container; and continues processing new IO requests using new dedicated data container.
General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

processing an input/output (IO) request on a storage processor within a storage system;

generating an entry in a transactional journal for the IO request;

storing a copy of the entry in the transactional journal in a dedicated data container in volatile memory of the storage processor;

in response to processing a subsequent IO request associated with the entry, at least partially overwriting the entry in the dedicated data container;

determining that a predefined storage capacity of the dedicated data container is met;

generating a storage location marker in the transactional journal;

copying each entry from the dedicated data container to a second dedicated data container;

generating a persisted copy of the dedicated data container by copying each entry from the dedicated data container to the transactional journal after the storage location marker; and copying new entries in the transactional journal to the second dedicated data container.

2. The computer-implemented method of claim 1, wherein the dedicated data container includes a dedicated array of entries for each flushing client that flushes data to persistent storage within the storage system.

3. The computer-implemented method of claim 1, further comprising:
    detecting a failure event associated with the storage system.

4. The computer implemented method of claim 3, further comprising:
    recovering each entry of the dedicated data container by:
        generating a new dedicated data container; and
        loading each entry from a persisted copy of the dedicated data container to the new dedicated data container.

5. The computer implemented method of claim 1, further comprising:
    performing an optimistic data deduplication operation based on the IO request.

6. The computer implemented method of claim 5, further comprising:
    identifying an incorrect data deduplication resulting from the optimistic data deduplication operation; and
    resolving the incorrect data deduplication by restoring a previous state of the entry associated with the incorrect data deduplication.

7. A computer program product residing on a non-transitory computer readable medium having a plurality of instructions stored thereon which, when executed by a processor, cause the processor to perform operations comprising:
    processing an input/output (IO) request on a storage processor within a storage system;
    generating an entry in a transactional journal for the IO request;
    storing a copy of the entry in the transactional journal in a dedicated data container in volatile memory of the storage processor;
    in response to processing a subsequent IO request associated with the entry, at least partially overwriting the entry in the dedicated data container;
    determining that a predefined storage capacity of the dedicated data container is met;
    generating a storage location marker in the transactional journal;
    copying each entry from the dedicated data container to a second dedicated data container;
    generating a persisted copy of the dedicated data container by copying each entry from the dedicated data container to the transactional journal after the storage location marker; and
    copying new entries in the transactional journal to the second dedicated data container.

8. The computer program product of claim 7, wherein the dedicated data container includes a dedicated array of entries for each flushing client that flushes data to persistent storage within the storage system.

9. The computer program product of claim 7, wherein the operations further comprise:
    detecting a failure event associated with the storage system.

10. The computer program product of claim 9, wherein the operations further comprise:
    recovering each entry of the dedicated data container by:

generating a new dedicated data container; and
    loading each entry from a persisted copy of the dedicated data container to the new dedicated data container.

11. The computer program product of claim 7, wherein the operations further comprise:
    performing an optimistic data deduplication operation based on the IO request.

12. The computer program product of claim 11, wherein the operations further comprise:
    identifying an incorrect data deduplication resulting from the optimistic data deduplication operation; and
    resolving the incorrect data deduplication by restoring a previous state of the entry associated with the incorrect data deduplication.

13. A computing system comprising:
    a memory; and
    a processor configured to process an input/output (IO) request on a storage processor within a storage system, wherein the processor is further configured to generate an entry in a transactional journal for the IO request, wherein the processor is further configured to store a copy of the entry in the transactional journal in a dedicated data container in volatile memory of the storage processor, wherein the processor is further configured to, in response to processing a subsequent IO request associated with the entry, at least partially overwrite the entry in the dedicated data container, wherein the processor is further configure to determine that a predefined storage capacity of the dedicated data container is met, wherein the processor is further configured to generate a storage location marker in the transactional journal, wherein the processor is further configured to copy each entry from the dedicated data container to a second dedicated data container, wherein the processor is further configured to generate a persisted copy of the dedicated data container by copying each entry from the dedicated data container to the transactional journal after the storage location marker, and wherein the processor is further configured to copy new entries in the transactional journal to the second dedicated data container.

14. The computing system of claim 13, wherein the dedicated data container includes a dedicated array of entries for each flushing client that flushes data to persistent storage within the storage system.

15. The computing system of claim 13, wherein the processor is further configured to:
    detect a failure event associated with the storage system.

16. The computing system of claim 15, wherein the processor is further configured to:
    recover each entry of the dedicated data container by:
        generating a new dedicated data container; and
        loading each entry from a persisted copy of the dedicated data container to the new dedicated data container.

17. The computing system of claim 13, wherein the processor is further configured to:
    perform an optimistic data deduplication operation based on the IO request.

* * * * *